(12) United States Patent
Brückner et al.

(10) Patent No.: US 10,464,160 B2
(45) Date of Patent: Nov. 5, 2019

(54) RESISTANCE SPOT WELDING APPARATUS

(71) Applicant: SIEMENS AKTIENGESELLSCHAFT, München (DE)

(72) Inventors: Jan Brückner, Uttenreuth (DE); Martin Effert, Erlangen (DE)

(73) Assignee: SIEMENS AKTIENGESELLSCHAFT (DE)

( * ) Notice: Subject to any disclaimer, the term of this patent is extended or adjusted under 35 U.S.C. 154(b) by 957 days.

(21) Appl. No.: 14/438,308

(22) PCT Filed: Oct. 17, 2013

(86) PCT No.: PCT/EP2013/071762
§ 371 (c)(1),
(2) Date: Apr. 24, 2015

(87) PCT Pub. No.: WO2014/067794
PCT Pub. Date: May 8, 2014

(65) Prior Publication Data
US 2015/0290737 A1 Oct. 15, 2015

(30) Foreign Application Priority Data
Oct. 31, 2012 (DE) .......... 10 2012 219 898

(51) Int. Cl.
B23K 11/00 (2006.01)
F22B 37/10 (2006.01)
(Continued)

(52) U.S. Cl.
CPC .......... B23K 11/004 (2013.01); B23K 11/31 (2013.01); F22B 37/10 (2013.01); F22B 37/18 (2013.01)

(58) Field of Classification Search
CPC .......... B23K 11/004; B23K 11/31
(Continued)

(56) References Cited

U.S. PATENT DOCUMENTS 3,892,942 A * 7/1975 Canale .......... B23K 9/007
219/127
4,239,953 A 12/1980 Bock
(Continued)

FOREIGN PATENT DOCUMENTS

CN 2602865 Y 2/2004
DE 102010042457 A1 4/2012
(Continued)

OTHER PUBLICATIONS

International Search Report; PCT/EP2013/071762; International Filing Date: Oct. 17, 2013; 2pgs.
(Continued)

*Primary Examiner* — Dana Ross
*Assistant Examiner* — Ayub A Maye
(74) *Attorney, Agent, or Firm* — Schmeiser, Olsen & Watts LLP

(57) ABSTRACT

A resistance point welding apparatus for fixing a turbulence installation body to an inner wall of a steam generator pipe, having a welding head, which is introduced into the pipe and includes a lance having an electrically conductive material, a point welding electrode, which projects out of the lance in the radial direction, an effective element and an insulation body, which is opposite the point welding electrode in the radial direction and is moved by the effective element, is provided. The lance is tapered at a defined distance from the welding head end such that the insulation body and the point welding electrode press the turbulence installation body against the inner wall of the pipe when the effective element is activated. When a welding stream is impressed on the
(Continued)

lance, a point-like welding stream flows via the point welding electrode to a counter electrode arranged outside the pipe.

6 Claims, 2 Drawing Sheets

(51) Int. Cl.
*F22B 37/18* (2006.01)
*B23K 11/31* (2006.01)

(58) Field of Classification Search
USPC .. 219/86.1, 86.23, 86.24, 86.25, 86.32, 86.8
See application file for complete search history.

(56) References Cited

U.S. PATENT DOCUMENTS

| | | | | |
|---|---|---|---|---|
| 4,761,532 A | * | 8/1988 | Bock | B23K 11/0033 219/66 |
| 4,788,407 A | * | 11/1988 | Flater | B23K 11/3018 137/614.11 |
| 4,868,649 A | * | 9/1989 | Gaudin | B23K 9/1087 219/121.23 |
| 5,530,218 A | * | 6/1996 | Nakamura | B23K 11/314 219/86.25 |
| 5,831,235 A | | 11/1998 | Cecil | |
| 2007/0207186 A1 | * | 9/2007 | Scanlon | A61F 2/07 424/424 |
| 2013/0186872 A1 | | 7/2013 | Brueckner | |

FOREIGN PATENT DOCUMENTS

| | | |
|---|---|---|
| EP | 2390039 A1 | 11/2011 |
| EP | 2390567 A1 | 11/2011 |
| JP | S50109856 A | 8/1975 |
| JP | 2012091199 A | 5/2012 |
| WO | WO 2012049088 A1 | 4/2012 |

OTHER PUBLICATIONS

Japanese Office Action dated Aug. 16, 2016; Application No. 2015-538383; 5 pgs.

* cited by examiner

RESISTANCE SPOT WELDING APPARATUS

CROSS-REFERENCE TO RELATED APPLICATIONS

This application claims priority to PCT Application No. PCT/EP2013/071762, having a filing date of Oct. 17, 2013, based on DE 102012219898.9 having a filing date of Oct. 31, 2012, the entire contents of which are hereby incorporated by reference.

FIELD OF TECHNOLOGY

The following relates to a resistance spot welding apparatus for attaching a turbulence insert in steam generator pipes.

BACKGROUND

In resistance welding, the components to be connected are pressed together and are melted electrically by the welding current at the contact point between the components.

In that context, the most significant in practice is resistance spot welding, in which the punctiform electrodes of the welder tongs press the components to be connected directly against one another. Necessary components of resistance welding are welder tongs with the welding electrodes, a source of welding current connected to the welder tongs, which source has a welding transformer, and a welding control unit and, where relevant, a process monitoring system for appropriately controlling the welding process.

In the case of resistance spot welding, the parts to be joined are then usually pressed together pneumatically at the two welding electrodes with a predefined force. Then, the welding current is switched on for the duration of the welding time. The electrical resistance at the contact point between the two parts is then substantially greater than the actual electrical resistance of the materials of the parts to be joined. By means of the punctual thermoelectric heating over the contact resistance achieved thereby, there thus results a lenticular melt. The simultaneous pressure via the electrode force effects a punctual, material-bonded and permanent connection. The electrode force is maintained during a dwell time in order to thus ensure that the melt cools in a manner which avoids the formation of voids.

Steam generator pipes with a turbulence-generating insert are then of use when the flow medium is to be made to flow faster at the internal face of the steam generator pipes. In that context, the use of such internally-ribbed pipes can be necessary for various reasons, e.g. in the case of a low mass flow rate through the evaporator when a power station is at full load. The use of internally-ribbed pipes can also be necessary in the case of high heat flux. In this case there is namely the risk of film boiling, that is to say there forms on the inside of the steam generator pipes a film of steam which, contrary to the thoroughly mixed liquid in the case of nucleate boiling, has a strongly thermally insulating effect. The consequence of this is that, if the heat flux remains the same, the wall temperature can increase markedly, which in turn can lead to the destruction of the heating faces. Last but not least, the internally-ribbed pipes can make it possible to avoid a stratification of the flow (separation of the water and steam phases) in normal load operation.

EP 2 390 567 A1 describes a method in which a turbulence-generating insert is attached in grooves of a template shaft, the template shaft is then inserted with the insert into a steam generator pipe, the insert is detached from the template shaft and the template shaft is then removed again from the steam generator pipe.

EP 2 390 039 A1 describes a device and a method for attaching, in materially-bonded fashion, such a turbulence-generating insert into a steam generator pipe by means of shielding gas welding.

SUMMARY

Embodiments of the invention provide a resistance spot welding apparatus for attaching a turbulence insert in steam generator pipes.

With the resistance spot welding apparatus according to embodiments of the invention, in contrast to shielding gas welding, the turbulence insert can in that context be attached with ease. By virtue of the welding head being formed according to embodiments of the invention, the turbulence insert can be connected to the internal wall of the steam generator pipe in materially-bonded and permanent fashion by means of resistance spot welding, at any point of the steam generator pipe. Then, the active member—which according to embodiments of the invention is preferably formed as a hydraulic cylinder—is deactivated, such that the welding head can be moved in the steam generator pipe to the next spot welding point. For particularly effective spot welding, the lance of the resistance spot welding apparatus is advantageously made of copper, with its outstanding electrically conductive properties, and the spot welding electrode, which is not exempt from wear, is exchangeable.

If the welding head is arranged at the very end of a shaft which is formed as a template shaft for introducing the insert into the steam generator pipe, the steps of introducing the insert into the steam generator pipe and of attaching the insert can be carried out with the same resistance spot welding apparatus designed according to embodiments of the invention.

BRIEF DESCRIPTION

Some of the embodiments will be described in detail, with reference to the following figures, wherein like designations denote like members, wherein.

DETAILED DESCRIPTION

Figure 1:
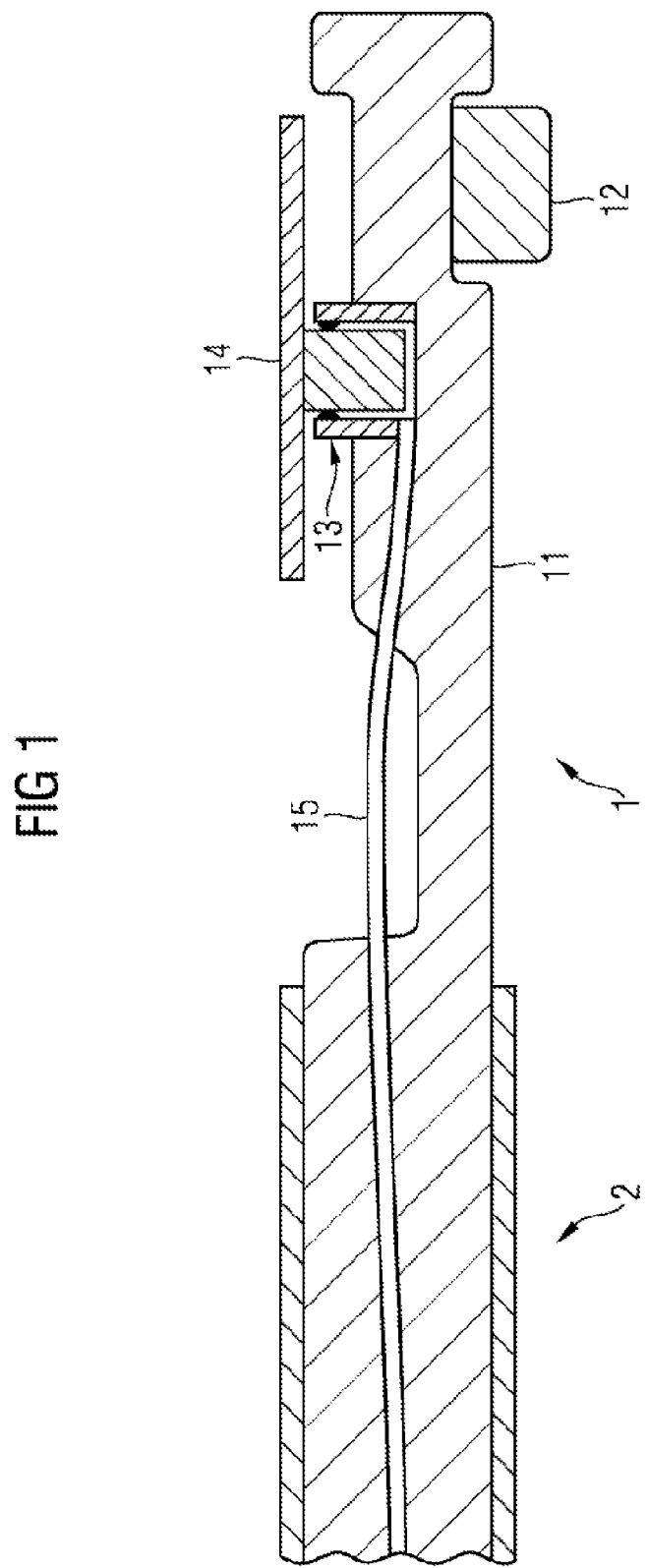
FIG. 1 shows a cross section through an embodiment of a welding head.

The welding head, shown in cross section in FIG. 1, for attaching a turbulence insert to an internal wall of a steam generator pipe, has according to embodiments of the invention a substantially cylindrical lance 11 made of an electrically conductive material (preferably copper), a spot welding electrode 12 which projects radially from the lance 11, an active member 13 and an insulating body 14 which lies radially opposite the spot welding electrode 12 and can be moved by the active member 13 toward the internal wall of the steam generator pipe. The lance 11 is tapered at a defined distance from the end of the welding head such that the insulating body 14 and thus also the spot welding electrode 12 press the turbulence insert against the internal wall of the steam generator pipe when the active member 13 is activated. In the case of the exemplary embodiment represented in FIG. 1, the active member 13 is a hydraulic cylinder which is embedded in the cylindrical lance, transversely to the axis of the latter. Hydraulic fluid from a pressure accumulator (not illustrated in any more detail) or also a hydraulic pump can be introduced via a supply line 15 into the hydraulic cylinder 13 and thus the hydraulic piston installed in the hydraulic cylinder can be extended. The insulating body 14 is connected to the hydraulic piston. If hydraulic fluid is now pumped into the hydraulic cylinder via the supply line 15, the hydraulic piston moves out of the hydraulic cylinder and thus moves the insulating body 14 toward the internal wall of a steam generator pipe fitted over the welding head. In that context, a turbulence insert, previously introduced into the steam generator pipe by means of a template shaft, is first pressed against the internal wall by the insulating body 14. As the movement of the hydraulic piston out of the hydraulic cylinder increases, the lance 11 will bend at the tapered position and thus deflect toward the internal wall that part of the lance 11 which, at the head end, contains the spot welding electrode 12. Thus, on the opposite side from the insulating body 14, the spot welding electrode now also presses the turbulence insert against the pipe internal wall. If a welding current is then applied to the lance 11, this current can flow via the spot welding electrode 12 through the steam generator pipe to a counter electrode 3 arranged outside the steam generator pipe (see FIG. 2) and thus, at the point at which the spot welding electrode 12 presses against the turbulence insert, a materially-bonded connection between the turbulence insert and the steam generator pipe can result. Since the hydraulic cylinder 13 is under pressure, the spot welding electrode 12 does not lose contact with the melted and softened material of the insert during the welding contact. In order for this contact to be reliable during the welding procedure, the tapered portion of the lance 11 must be dimensioned such that the opposite deflection of the lance 11 and the insulation body 14 leads to the spot welding electrode 12 being pressed in a durable manner against the turbulence insert. Once the welding procedure is finished, the hydraulic fluid is removed again from the hydraulic cylinder 13, the hydraulic piston once again enters further into the hydraulic cylinder 13 and thus the insulation body 14 and the lance 11 move away again from the internal wall and toward the axis of the welding head 1. The welding head 1 can then be guided to the next position in the steam generator pipe in order to then repeat the welding procedure at that position. It is thus possible to achieve, step-by-step, a reliable and materially-bonded attachment of turbulence inserts in steam generator pipes.

Figure 2:
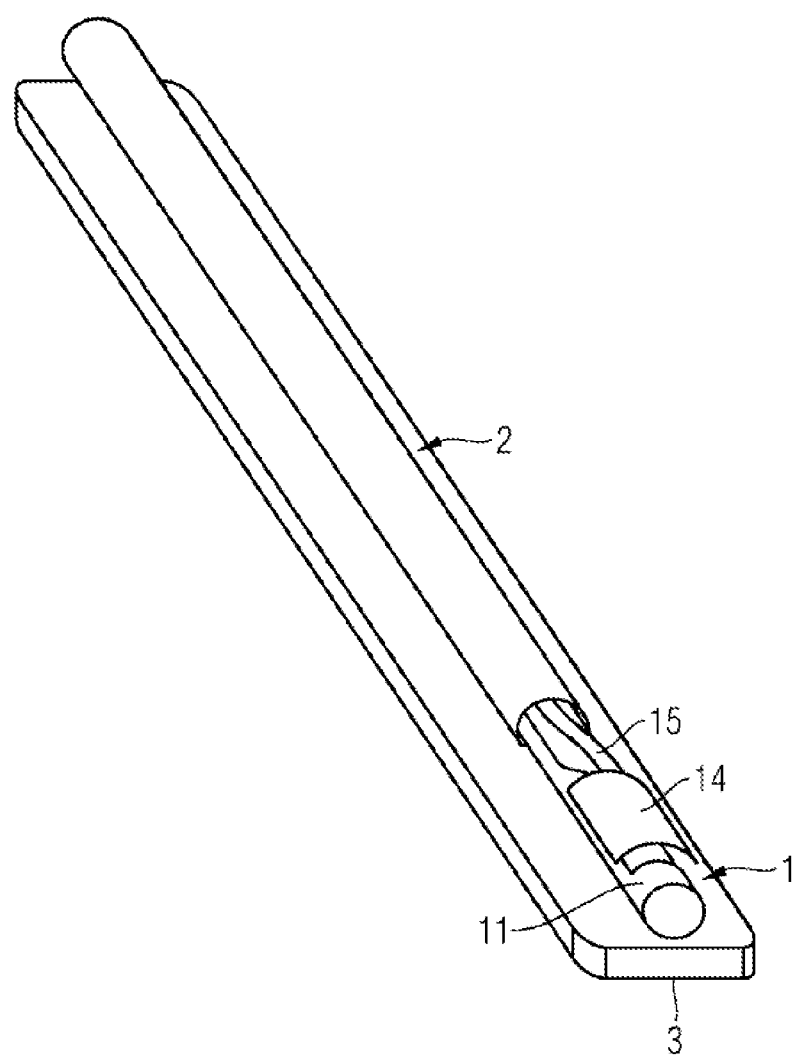
FIG. 2 shows a perspective view of an embodiment of a resistance spot welding apparatus.

FIG. 2 shows, in a perspective representation, the essential components of the resistance spot welding apparatus, in this case the insulated shaft 2 with welding head 1 over which a steam generator pipe can be fitted from the front, from the end side of the welding head, and, arranged below this, the flat counter electrode 3 which must be in contact with the steam generator pipe fitted over the shaft 2 and the welding head 1 in order in this manner to ensure a reliable flow of current between the spot welding electrode and the counter electrode during the welding procedure. The insulation of the shaft 2 is in this case effected by means of an insulation tube which surrounds the electrical and hydraulic supply lines for the welding head 1. At the same time, the insulation tube serves as a guide for the welding head 1 in the steam generator pipe, such that its external diameter should be somewhat smaller than the free internal diameter of the steam generator pipes with installed turbulence inserts.

In order to weld the turbulence insert, which has been introduced by means of a template shaft into a steam generator pipe, to the internal wall of the latter, the welding head 1 follows the template shaft at a small distance from the opposite side when unscrewing from the steam generator pipe. The turbulence insert is preferably a spiral, wire-like structure which, for the purpose of being introduced into the steam generator pipe, is fixed in the grooves of the template shaft. Since this structure has a certain inherent tension and thus bears against the internal wall of the steam generator tube, the position of the turbulence insert is also known within tight tolerances shortly after unscrewing from the grooves. If a first welding point is established when the welding head is introduced, all further welding points can be determined with the aid of the advance of the welding head, using the known geometry of the turbulence insert. If the introduction of the welding head and the execution of the resistance spot welding are carried out at the same time as the unscrewing of the template shaft, then particularly tight tolerances for the position of the insert in the steam generator pipe can be expected. Moreover, it is thus possible to accelerate the manufacturing process.

If, by contrast, the shaft is itself already formed as a template shaft for introducing the insert into the steam generator pipe, it is possible for the turbulence insert to be welded in the steam generator pipe at the same time as the template shaft is removed.

Overall, the resistance spot welding apparatus according to embodiments of the invention provides the following advantages. Using the described welding apparatus, the turbulence insert can be welded to the steam generator pipe at any point in the latter. The welding point is positioned solely via the position of the welding head within the steam generator pipe. The position of the turbulence insert is known on account of the position of the first welding point and the geometry of the insert (number of wires and pitch).

Since the position of the turbulence insert in the steam generator pipe is known, it is not necessary to exactly determine the position prior to each welding procedure. In comparison to shielding gas welding methods, a marked shortening of the assembly time is to be expected.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The claims are as follows:

1. A resistance spot welding apparatus for attaching a turbulence insert to an internal wall of a steam generator pipe, comprising:
   a welding head which is introduced into the steam generator pipe and which comprises a cylindrical lance made of an electrically conductive material;
   a spot welding electrode which projects radially from the cylindrical lance; and
   an active member and an insulating body which lies radially opposite the spot welding electrode and is moved by the active member toward the internal wall;
   wherein the cylindrical lance includes a tapered section that is tapered at a defined distance from an end of the welding head such that the cylindrical lance bends at the tapered section so that insulating body and the spot welding electrode press the turbulence insert against the internal wall of the steam generator pipe when the active member is activated;

wherein the active member is a hydraulic cylinder embedded into the cylindrical lance;

wherein, when a welding current is applied to the cylindrical lance, a punctiform welding current flows via the spot welding electrode to a counter electrode arranged outside the steam generator pipe.

2. The resistance spot welding apparatus as claimed in claim 1, wherein the cylindrical lance is made of copper.

3. The resistance spot welding apparatus as claimed in claim 1, wherein the spot welding electrode is exchangeable.

4. The resistance spot welding apparatus as claimed in claim 1, wherein the welding head is arranged at an end of a shaft surrounded by insulation, wherein the shaft guides the supply lines for the welding head and a length of the shaft corresponds to at least half a length of the steam generator pipe.

5. The resistance spot welding apparatus as claimed in claim 4, wherein there is provided a template shaft for introducing the turbulence insert into the steam generator pipe, wherein at the same time as the template shaft is unscrewed from the turbulence insert, the welding head is increasingly introduced into the steam generator pipe.

6. The resistance spot welding apparatus as claimed in claim 4, wherein the shaft is formed as a template shaft for introducing the turbulence insert into the steam generator pipe.

* * * * *